Feb. 5, 1957 H. A. MULLEN 2,780,718
SPOT WELDING TIP
Filed March 9, 1953
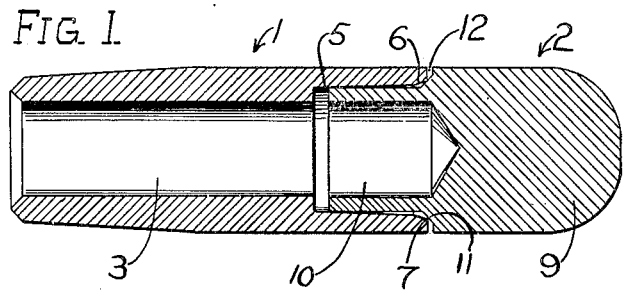
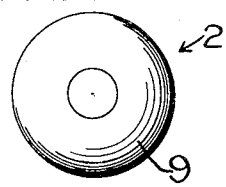
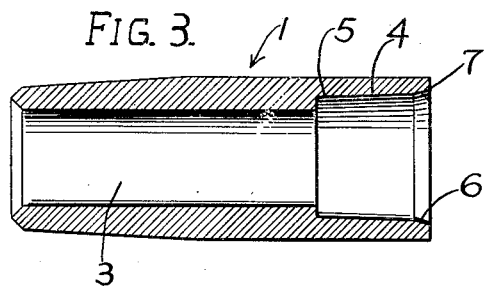
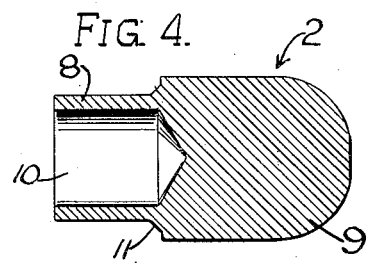
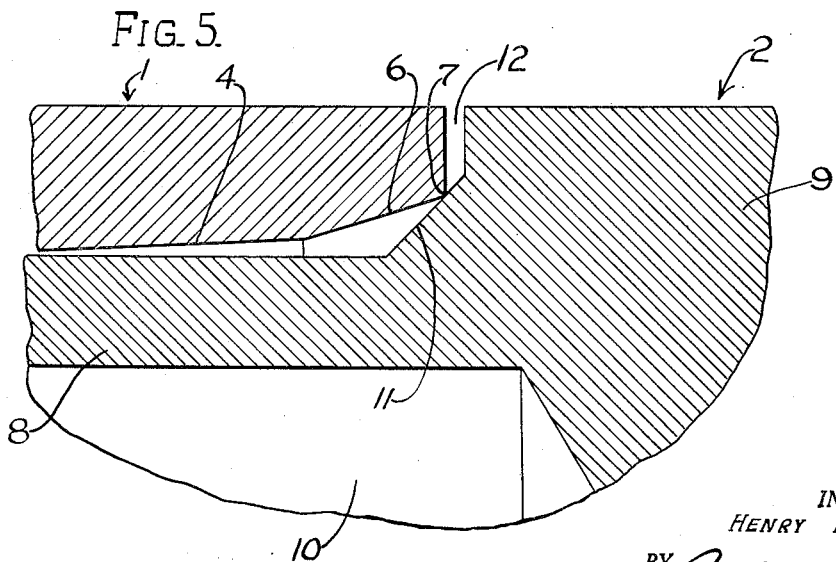
INVENTOR.
HENRY A. MULLEN
BY
ATTORNEYS

United States Patent Office 2,780,718
Patented Feb. 5, 1957

2,780,718

SPOT WELDING TIP

Henry A. Mullen, Wauwatosa, assignor to Ampco Metal, Inc., Milwaukee, Wis., a corporation of Wisconsin Application March 9, 1953, Serial No. 341,165

4 Claims. (Cl. 219—120)

This invention relates to a spot welding tip and more particularly to a spot welding tip having a replaceable head.

An object of the present invention is to provide a spot welding tip having a replaceable head which is sealed in a fluid-tight engagement with the shank of the tip at two separate positions.

Another object of the invention is to provide a spot welding tip having a head which is rigidly centered therein.

Still another object is to provide an improved engagement between a spot welding tip head and shank whereby there is more effective transmission of axial pressure to the head.

Another object is to provide a spot welding tip with a replaceable head which may be readily inserted and removed.

A further object is to provide a spot welding tip having a replaceable head wedged into engagement with the shank thereof so as to provide a tight and effective electrical and thermal contact between the two parts.

The present invention is directed to a spot welding tip comprising a generally cylindrical shank and a head which includes a cylindrical stem and an enlarged contact nose. The stem is removably secured within an axial bore in the shank by a wedging engagement.

A secondary engagement is provided between the head and the shank by the contact of the peripheral edge bordering the axial bore on the forward face of the shank and the tapering surface connecting the stem and the nose of the head.

This secondary engagement which is located outward of the wedging engagement serves to provide an auxiliary seal to prevent leakage of the cooling fluid from the interior of the shank and also functions to more effectively center the head within the shank than is possible with only a wedging engagement between the head and shank, thus permitting a more effective transmission of axial thrust from the shank to the head.

Other objects and advantages will appear in the course of the following description.

In the drawings:

Figure 1 is a longitudinal section of the welding tip showing the engagement of the head within the shank;

Fig. 2 is an end elevation of the head;

Fig. 3 is a longitudinal section of the shank;

Fig. 4 is a longitudinal section of the head, and

Fig. 5 is an enlarged fragmentary view of Figure 1 showing the secondary bearing engagement between the head and the shank.

Referring to the drawings, there is shown a spot welding tip comprising a shank 1 and an enlarged head 2 which is removably secured to the shank and is adapted to contact the workpiece to be welded.

Shank 1 is generally cylindrical in shape with the rearward portion thereof being tapered toward the rearward end.

To cool the shank during welding, the shank is provided with an axial bore 3. The rearward end of bore 3 is adapted to receive a conventional fluid nozzle, not shown, which is in communication with a suitable source of cooling fluid.

The forward portion of bore 3 which receives head 2 is provided with an enlarged diameter and is tapered inwardly as shown at 4. The degree of taper of surface 4 is relatively small, preferably in the neighborhood of 1° to 3°. The tapered surface 4 terminates inwardly at the annular shoulder 5.

The forward end of bore 3 adjacent the forward face of shank 1 is also tapered, as indicated at 6, with the degree of taper being about 30° and considerably greater in magnitude than the degree of taper of surface 4. The surface 6 is defined on the forward face of shank 1 by a relatively sharp annular edge 7 which serves as a seat for the head 2.

Head 2 comprises a generally cylindrical stem 8 to be received within the tapered portion 4 of bore 3 and an enlarged nose 9 adapted to contact the workpiece.

To provide a tight engagement between the head 2 and shank 1, the outer surface of stem 8 has a generally cylindrical shape, and when the stem 8 is inserted within the tapered portion 4 of bore 3, it is held therein by a wedging engagement between the two contiguous surfaces. In the normal position of engagement the inner end of stem 8 is spaced outwardly a slight distance from the internal shoulder 5.

The nose 9 may be of any desired shape depending on the particular welding to be encountered. As shown in the drawings, the nose has a generally rounded, blunt configuration.

To cool the head 2, the stem 8 is provided with an axial bore 10 which communicates with bore 3 and permits the cooling fluid to flow within the head and thus dissipate the heat therefrom.

In addition to the wedging engagement between stem 8 and tapered portion 4, a secondary engagement is provided between the head and shank whereby the annular edge 7 of shank 1 bears against an external slant or tapered surface 11 which may be either frusto-conical or curved on a suitable radius as a fillet extending between stem 8 and nose 9 of head 2. The degree of taper of surface 11 is preferably in the neighborhood of about 45° and greater than the taper of surface 6 so that the inner portion of surface 11 will extend within shank 1 and the annular edge 7 of the shank will bear firmly against the central portion of surface 11.

As the secondary engagement between the head 2 and the shank 1 is located outwardly of the wedging engagement between the two parts, the head will be maintained in axial alignment with the shank at all times. If the attachment between the shank and the head consisted merely of the wedging engagement, the head could very easily be misaligned within the tapered bore 4 and any pressure exerted on the head during welding would tend to increase the misalignment and perhaps damage the surfaces which are in wedging contact. With the secondary seal of the present invention provided by the contact of edge 7 with slant surface 11, the head will at all times be centered with the shank and axial pressure exerted at the shank will be effectively transmitted through the head to the workpiece.

The present invention provides a plural sealing connection between the head and the shank. The wedging engagement between stem 8 and tapered surface 4 serves as the primary seal to prevent the cooling fluid contained in bore 3 from escaping to the exterior of welding tip. In event of wear or damage to the wedging surfaces, the sealing engagement of edge 7 with surface 11 will also serve as a seal to prevent the leakage of the cooling fluid from the welding tip.

As the annular edge 7 is adapted to engage the central portion of surface 11 in providing the secondary engagement, a clearance 12 or space is provided between the forward face of shank 1 and the nose 9. By inserting a thin article such as a knife blade within clearance 12 and prying, the head can be readily removed from the shank for replacement purposes.

Various embodiments of the invention may be employed within the scope of the following claims.

I claim:

1. A spot welding tip which comprises a shank having a longitudinal bore therethrough with an end of said bore being tapered, said shank being provided with a second tapered surface extending from the end of said shank to the tapered end of said bore, and a head comprising a generally cylindrical stem to be received in sealing engagement within said tapered end of said bore and an enlarged nose to contact the workpiece, said stem and said nose being joined by a generally frusto-conical shoulder having a degree of taper in excess of the degree of taper of said second tapered surface and adapted to bear against the circular edge outwardly bordering said second tapered surface to rigidly center said head within said shank and to provide a clearance between the end of said shank and the adjacent end of said nose of a dimension sufficient to permit a thin article to be inserted therebetween to pry said shank and head apart.

2. A spot welding tip which comprises a shank having an axial bore therethrough with one end of said bore being tapered inwardly toward the center of said shank and having a degree of taper of about 1° to 3°, said shank being provided with a second tapered surface extending inwardly from the end of said shank to the tapered end of said bore and having a taper of about 30°, and a head comprising a generally cylindrical stem to be received in wedging engagement within the tapered end of said bore and an enlarged outer nose to contact the workpiece, said stem and said nose being joined by a tapered shoulder having a degree of taper of about 45° and adapted to bear against the circular edge on the end of said shank outwardly bordering said second tapered surface to rigidly center said head within said shank and provide a secondary seal therebetween and for the transmission of pressure therebetween, the end of said shank and the head adjacent thereto outwardly of said respective tapered portions being substantially normal to the longitudinal axis of the tip and being spaced apart for receiving an instrument to pry the head loose for removal.

3. A spot welding tip which comprises a shank having an axial bore to receive a circulating water cooling medium and formed with a generally annular tapered surface extending between an end of said shank and said bore to provide an annular end edge at the end of the shank of generally larger diameter than the bore, and a replaceable head having a stem to be received in water sealing and guiding engagement within said bore and said head having an annular tapered shoulder formed with a greater degree of taper than said tapered surface of said shank and facing the end of said shank to bear against the annular edge bordering said tapered surface in a continuous circular biting contact and provide a secondary seal between said shank and said head.

4. A spot welding tip which comprises a shank having a central cylindrical bore with an enlarged outer end providing a circular inner corner edge at the outer end of the shank and of a larger diameter than the diameter of said bore, and a replaceable head having a stem received in water sealing and guiding wedging engagement within the outer end of said bore and having an axial recess in said stem communicating with said bore, said bore and said recess to contain a water cooling fluid adapted to conduct heat from the head during welding, said head being provided with a slanting shoulder surface completely encircling said stem and disposed to bear against the annular corner edge portion bordering said end of the bore in a continuous circular biting contact to transmit the welding pressures from said shank to said head and to provide a secondary seal between said shank and said head, said circular biting contact being spaced longitudinally from the wedging engagement between the stem and the bore and being of generally larger diameter than said bore to maintain the alignment of said head and shank under welding pressures exerted thereon.

References Cited in the file of this patent

UNITED STATES PATENTS

| | | |
|---|---|---|
| 1,288,376 | Bleichrode | Dec. 17, 1918 |
| 1,360,897 | Dailey | Nov. 30, 1920 |
| 1,735,983 | Shrum | Nov. 19, 1929 |
| 2,234,486 | Craig | Mar. 11, 1941 |
| 2,355,145 | Carlson | Aug. 8, 1944 |
| 2,374,284 | Hall | Apr. 24, 1945 |
| 2,440,463 | Cornwall | Apr. 27, 1948 |
| 2,442,798 | Crabtree | June 8, 1948 |
| 2,563,592 | Elliott | Aug. 7, 1951 |

FOREIGN PATENTS

| | | |
|---|---|---|
| 595,585 | Great Britain | Dec. 9, 1947 |